United States Patent
McClean et al.

(10) Patent No.: US 8,867,914 B2
(45) Date of Patent: Oct. 21, 2014

(54) ASE COMPENSATION IN OPTICAL AMPLIFIERS

(75) Inventors: Ian McClean, Brixham (GB); Paul Johnson, Torquay (GB); Stephen Fourte, Ivybridge (GB)

(73) Assignee: II-VI Incorporated, Saxonburg, PA (US)

( * ) Notice: Subject to any disclaimer, the term of this patent is extended or adjusted under 35 U.S.C. 154(b) by 295 days.

(21) Appl. No.: 13/636,439

(22) PCT Filed: Mar. 21, 2011

(86) PCT No.: PCT/GB2011/050553
§ 371 (c)(1),
(2), (4) Date: Nov. 14, 2012

(87) PCT Pub. No.: WO2011/117613
PCT Pub. Date: Sep. 29, 2011

(65) Prior Publication Data
US 2013/0058646 A1    Mar. 7, 2013

(30) Foreign Application Priority Data

Mar. 22, 2010    (GB) .................................. 1004697.7

(51) Int. Cl.
| | | |
|---|---|---|
| H04B 10/293 | (2013.01) | |
| H01S 3/067 | (2006.01) | |
| H01S 3/10 | (2006.01) | |
| H04B 10/073 | (2013.01) | |
| H01S 3/13 | (2006.01) | |
| H01S 3/16 | (2006.01) | |

(52) U.S. Cl.
CPC ......... *H01S 3/06754* (2013.01); *H01S 3/10015* (2013.01); *H04B 10/0731* (2013.01); *H01S 3/10069* (2013.01); *H01S 3/1301* (2013.01); *H01S 3/1608* (2013.01); *H01S 2301/02* (2013.01)
USPC .......................................................... 398/37

(58) Field of Classification Search
USPC ............................................ 398/37; 359/337
See application file for complete search history.

(56) References Cited

U.S. PATENT DOCUMENTS

| | | | |
|---|---|---|---|
| 6,313,941 B1 | 11/2001 | Suzuki et al. | |
| 6,519,081 B2 | 2/2003 | Lelic et al. | |
| 7,139,117 B2 * | 11/2006 | Nakamura et al. | ............ 359/334 |
| 2007/0297044 A1 | 12/2007 | Qiao et al. | |

FOREIGN PATENT DOCUMENTS

| | | |
|---|---|---|
| EP | 1750333 B1 | 7/2010 |
| WO | 02/30014 A1 | 4/2002 |

OTHER PUBLICATIONS

Patent Cooperation Treaty, Written Opinion of the International Searching Authority, International Patent Application No. PCT/GB2011/050553, mailed Jun. 2, 2011, 7 pages.
International Search Report dated Jun. 6, 2011for International Application No. PCT/GB2011/050553, 2 pages.
GB Search Report dated Jul. 7, 2010 for Application No. GB1004697.7, 1 page.

\* cited by examiner

*Primary Examiner* — Shi K Li
(74) *Attorney, Agent, or Firm* — Fenwick & West LLP

(57) ABSTRACT

A method of operating a production optical amplifier comprises determining a training data set of amplified spontaneous emission (ASE) values of a training optical amplifier over a plurality of training operating conditions, determining a production data set of ASE values of the production optical amplifier over a plurality of production operating conditions, the plurality of production operating conditions corresponding to a sub-set of the plurality of training operating conditions, determining an adjusted data set of adjusted ASE values produced by extrapolation from the production data set so that the adjusted data set is provided over a plurality of operating conditions corresponding to the plurality of training operating conditions, determining, for each of a plurality of operating conditions, a dynamic ASE tilt factor from the training data set and the adjusted ASE data set so determined, determining a larger data set of ASE values over a wider set of operating conditions than either the training data set or the production data set from the adjusted ASE dataset and the dynamic ASE tilt factor, and compensating the optical output power of the production optical amplifier in correspondence with the larger ASE data set generated from the production data set and the dynamic ASE tilt factor over the plurality of operating conditions, which is preferably a larger set of operating conditions than that of the training data set or production data set. Advantageously a compensating ASE value can be more quickly and cheaply determined by this method compared to those shown in the prior art.

19 Claims, 4 Drawing Sheets

ASE COMPENSATION IN OPTICAL AMPLIFIERS

FIELD OF THE INVENTION

The invention relates to optical amplifiers and is concerned more particularly, but not exclusively, with erbium doped fibre amplifiers (EDFAs).

BACKGROUND TO THE INVENTION

In optical telecommunications networks, optical amplifiers are widely used to amplify optical data signals. In an optical amplifier having an inverted erbium doped fibre (EDFA) an input optical data signal is amplified by stimulated emission. Typically, the users seeks to amplify the optical data signal either by a set gain, which is known as gain mode amplification, or to a set power level, which is known as power mode amplification. The level of amplification is commonly, although not exhaustively, determined by sampling the optical output from the optical amplifier, and using the data in a feedback arrangement to generate a control signal to control the output power of a pump laser that pumps the optical inversion of the EDFA.

As well as amplification of the optical data signal, the EDFA generates a noise component through amplified spontaneous emission (ASE). The optical data signal is typically centred on one or more wavelengths corresponding to the channels standardised by the International Telecommunications Union (ITU). In contrast, the ASE is typically generated across a much broader wavelength range, e.g. around 40 nm, which is a substantial part of the gain bandwidth region of the amplifier. The level of ASE depends upon the optical data signal gain within the Er fibre, inversion and temperature of the EDF. Further, the level of ASE produced by an optical amplifier also varies due to the loss variability of optical components since passive losses in the amplifier affect the gain required in the erbium fibre.

Disadvantageously the level of the ASE in the optical output from an optical amplifier cannot be easily optically determined, since the optical power detectors (e.g. photodetectors) typically used in optical amplifiers are relatively wavelength insensitive (and necessarily so, in the case in which the optical amplifier should be adapted for operation at a range of ITU channels), and so detect both the amplified optical data signal and the ASE. Accordingly, disadvantageously, the presence of the variable amount of ASE leads to incorrect amplification of the optical data signal, which consequently increases detection errors in an associated optical network.

The following approaches are known which seek to address this problem.

In a fixed, single channel optical amplifier, it is known to use a fixed wavelength discriminating filter to filter out the ASE that arises at wavelengths away from the bandwidth of the optical data signal. Disadvantageously, such an approach is inflexible such that the optical amplifier can only be used for a fixed, defined wavelength of the filter and a different optical amplifier would need to be manufactured for each signal channel.

A further disadvantage of using a fixed wavelength discriminating filter is that this approach cannot be applied to optical amplifiers in systems that handle light at more than one channel, e.g. in optical networks comprising transmitters that use tunable laser optical sources. Although tunable filters are known, such components are too substantial in size and too costly to be commercially viable for deployment in many applications of commercially manufactured optical amplifiers at the current time.

A second approach requires each optical amplifier to be fully characterised for ASE over a large range of operating conditions prior to sale, so that the optical amplifier can be sold with a large, unique table of data, giving the levels of compensation that are required to ensure correct amplification of the optical data signal. This is particularly so for a single channel amplifier where there can be many unique operating input conditions of wavelength and optical signal data input power as well as a large number of unique gain or output power requirements. The ASE compensation data may be provided in a look-up table stored in the optical amplifier's operating system, or provided separately. Disadvantageously, full characterisation of every optical amplifier from a production line is time consuming, requires the deployment of a substantial resource of expensive characterisation equipment, and consequently substantially increases the manufacturing cost of the optical amplifiers.

A third approach seeks to estimate the level of ASE produced by use of an empirically derived equation, and applies a corresponding compensation coefficient to the gain of the optical amplifier, to adjust the output power of the optical data signal to the desired level. Such an approach is disclosed in U.S. Pat. No. 6,519,081. This technique works well when there is a known and consistent set of input optical signals, but, disadvantageously, the level of ASE produced does not conform to a simple empirical equation with respect to the variation of ASE level as a function of input optical signal wavelength.

Accordingly, there is a need for an improved method of operating an optical amplifier, which provides more accurate amplification of an optical data signal by a desired gain level or to a desired optical power level.

SUMMARY OF THE INVENTION

A first aspect of the invention provides a method of operating a production optical amplifier comprising:
(i) determining a data set of training amplified spontaneous emission (ASE) values of a training optical amplifier over a plurality of training operating conditions,
(ii) determining a data set of production ASE values of the production optical amplifier over a plurality of production operating conditions, the plurality of production operating conditions corresponding to a sub-set of the plurality of training operating conditions,
(iii) determining an adjusted data set of adjusted ASE values produced by extrapolation from the production data set so that the adjusted data set is provided over a plurality of operating conditions corresponding to the plurality of training operating conditions,
(iv) determining, for each of a plurality of operating conditions, a dynamic ASE tilt factor from the training data set and the adjusted data set so determined,
(v) determining a larger data set of ASE values over a wider set of operating conditions than either the training data set or the production data set from the adjusted ASE data set and the dynamic ASE tilt factor, and
(vi) compensating the optical output power of the production optical amplifier in correspondence with the larger ASE data set generated from the production data set and the dynamic ASE tilt factor over the plurality of operating conditions, which is preferably a larger set of operating conditions than that of the training data set or production data set.

A second aspect of the invention provides a production optical amplifier adapted to compensate an optical output for ASE noise in dependence on a data set of training amplified spontaneous emission (ASE) values previously obtained by use of a training optical amplifier over a plurality of training operating conditions, the amplifier comprising:
 (i) means for determining a data set of production ASE values of the production optical amplifier over a plurality of production operating conditions, the plurality of production operating conditions corresponding to a subset of the plurality of training operating conditions,
 (ii) means for determining an adjusted data set of adjusted ASE values produced by extrapolation from the production data set so that the adjusted data set is provided over a plurality of operating conditions corresponding to the plurality of training operating conditions,
 (iii) means for determining, for each of a plurality of operating conditions, a dynamic ASE tilt factor from the training data set and the adjusted data set so determined,
 (iv) means for determining a larger data set of ASE values over a wider set of operating conditions than either the training data set or the production data set from the adjusted ASE data set and the dynamic ASE tilt factor, and
 (v) means for compensating the optical output power of the production optical amplifier in correspondence with the larger ASE dataset generated from the production data set and the dynamic ASE tilt factor over the plurality of operating conditions, which is preferably a larger set of operating conditions than that of the training data set or production data set.

The adjusted ASE values may be determined from the data set of production ASE values by offsetting and tilting the production ASE values to match the training ASE values of the training data set. The offsetting and tilting may be determined to minimise the root mean square of a difference between corresponding ASE values of the training data set and the production data set.

When the production optical amplifier is placed in operation the ASE values so determined are used to compensate the total output power reading to generate a signal output power reading. This can be done by starting with, for example, 8 measured ASE values corresponding to 8 fixed operating conditions and by then generating a larger number of ASE values matched to the training values through tilt and offset which can be used to determine the ASE for a range of operating conditions.

Furthermore the adjusted ASE values may be used to determine ASE values at a range of wavelengths and/or external operating gains. In this manner it is possible to generate a large matrix of ASE values matched to the training values through tilt and offset which can be used to determine the ASE for any operating condition (rather than just a limited dataset).

The plurality of training operating conditions may comprise a plurality of operating wavelengths.

The plurality of production operating conditions may comprise an operating condition that does not correspond to a training operating condition.

The plurality of training operating conditions may comprise a plurality of gain or output power levels. The adjusted ASE values may be determined by offsetting and tilting training ASE values of the training data set, and the adjusted ASE values at each gain or output power level may be independently offset and tilted.

The plurality of training operating conditions may comprise a plurality of temperatures associated with part of the training optical amplifier and the production optical amplifier.

The training optical amplifier and the production optical amplifier may comprise erbium doped fibre amplifiers (EDFAs).

The training ASE values may be average training ASE values from a plurality of training optical amplifiers.

Preferably the method of operating a production optical amplifier furthermore comprising using channel wavelength information provided by an optical channel monitor (OCM) or an optical power monitor (OPM) or user input to adjust the ASE values in order to improve the gain or signal power accuracy.

Channel wavelength information may be provided by user input provided by an external optical channel monitor (OCM) or an optical power monitor (OPM), or provided by having a priori knowledge of the channel wavelength to adjust the ASE values in order to improve the gain or signal power accuracy.

Conveniently a measurement from the OCM or the OPM is taken either preceding or following amplification.

BRIEF DESCRIPTION OF THE DRAWINGS

For a better understanding of the present invention, and to show more clearly how it may be carried into effect, reference will now be made, by way of example only, to the accompanying drawings, in which.

DETAILED DESCRIPTION OF THE INVENTION

Figure 1:
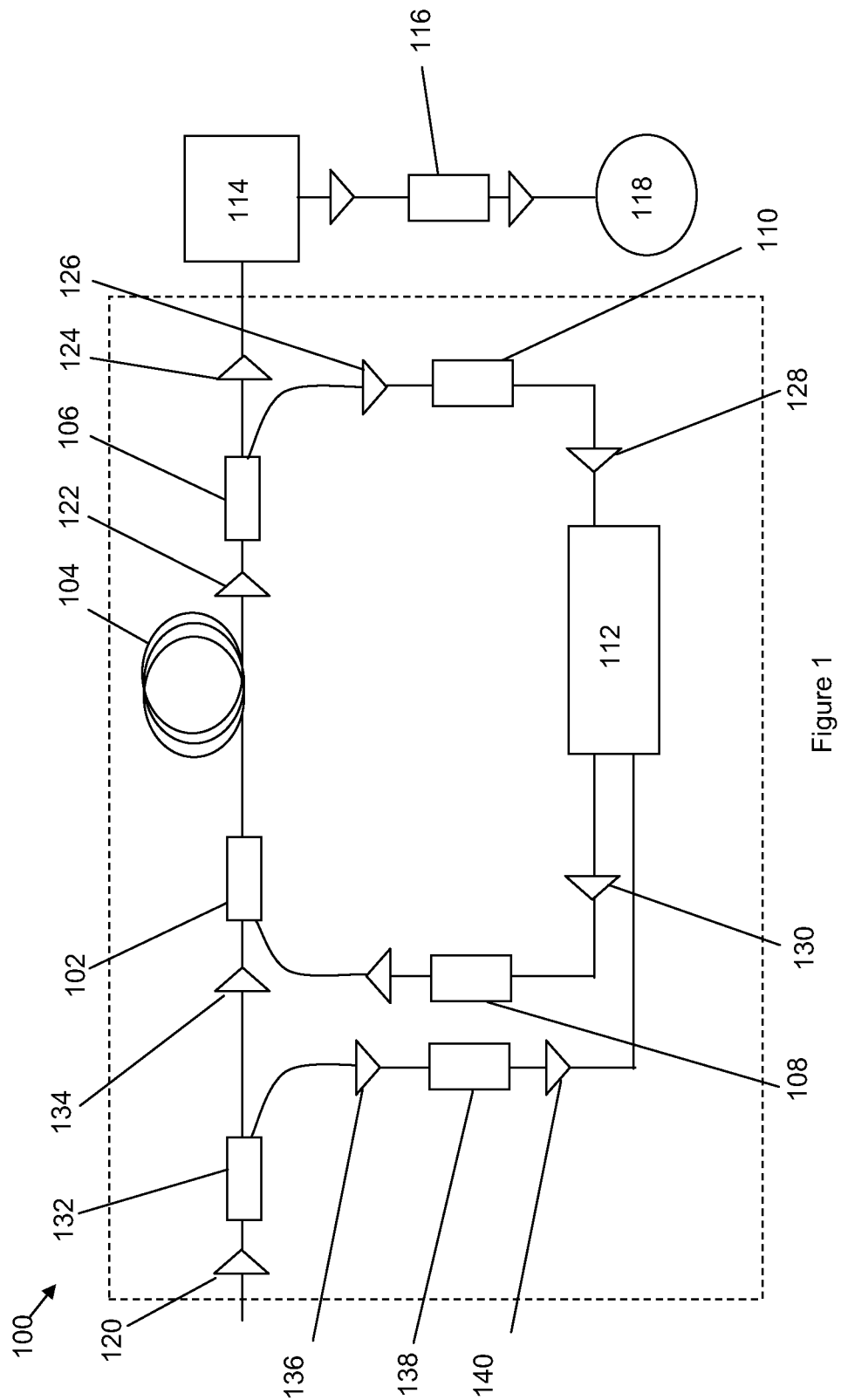
FIG. 1 schematically illustrates a training optical amplifier.

FIG. 1 illustrates an exemplary training optical amplifier 100. The training optical amplifier 100 comprises an input optical coupler 102, erbium doped fibre (EDF) 104, an output optical coupler 106, a pump laser 108, an optical detector 110 and control electronics 112.

An input optical data signal 120 is received by the training optical amplifier 100. The input optical data signal 120 is transmitted to the input optical coupler 132. The input optical coupler 132 is an optical splitter which splits the amplifier optical data signal 120 into an optical data signal to be amplified 134 and sampled light 136. An optical detector 138 (e.g. a photodetector) generates an electrical detector signal 140 in correspondence with the optical power of the received, sampled light 136. The optical data signal 134 is transmitted through a subsequent optical coupler 102 to the EDF 104. The optical data signal 134 is amplified by the EDF 104, producing both an amplified optical data signal and ASE noise 122, which is transmitted through the output optical coupler 106. The output optical coupler 106 is an optical splitter, which splits the amplified optical data signal 122 into an optical amplifier output 124 and sampled light 126. The optical detector 110 (e.g. a photodetector) generates an electrical detector signal 128 in correspondence with the optical power of the received, sampled light 126. An electrical control signal 130 from the control electronics 112 sets the output power of the pump laser 108 in accordance with a feedback routine. The feedback routine operates in accordance with the electrical detector signals 140 and 128 to set the optical gain of the training optical amplifier 100 to a predetermined level. An alternative approach would be for the feedback routine to set the pump laser 108 in accordance with the electrical detector signal 128 to set the optical output power of the training optical amplifier 100 to a predetermined level.

Parameters that affect the ASE performance of the training optical amplifier 100 include the wavelength of the optical data signal that is being amplified, the gain level or output power level of the optical data signal, and the temperature of the EDF. The optical amplifier output 124 is optically coupled to an optical spectrum analyser 114, which analyses the light through a data processor 116 to determine the optical power of the amplified input optical data signal and the ASE noise.

The ASE performance of the training optical amplifier 100 is characterised over a training range of wavelengths by provision of input optical data signals 120 over a range of wavelengths, and corresponding ASE values are determined. The ASE performance is also characterised at different gain levels or power outputs. Further, the ASE performance may be characterised at different EDF temperatures.

Advantageously the ASE performance is characterised at a high optical gain condition and a low optical gain condition. Advantageously, the ASE performance is characterised over the same wavelengths λ, at the high and low optical gain conditions. ASE values corresponding to the gain and wavelength conditions are collated within a training data set 118.

Advantageously several optical amplifiers 100 are characterised over identical operating conditions to determine mean values for ASE values from a representative sample of devices from the manufacturing process.

In a preferred training cycle a reference ASE/λ/Gain dataset comprising the amount of ASE present for a given input signal wavelength for a given external gain was generated only once, the dataset comprising data points 200A and 200B (FIG. 2) at high and low gain conditions across the working wavelength bandwidth of the specific amplifier. For one particular application 11 wavelengths were selected across the band (22 points) to obtain a prediction accuracy to meet the specific specification of ASE/λ, although generally the more wavelengths that are selected the more accuracy is obtained in production. In addition interpolation was effected between the 11 wavelength points to obtain more data points. The method used to generate the dataset was to obtain measurements of the ASE/λ/Gain dataset for ten amplifiers and to then average the data obtained by such measurements. This was done to remove the variation in passive losses across amplifiers to obtain the average passive loss. The more amplifiers that are measured the better the average data obtained.

Figure 2A:
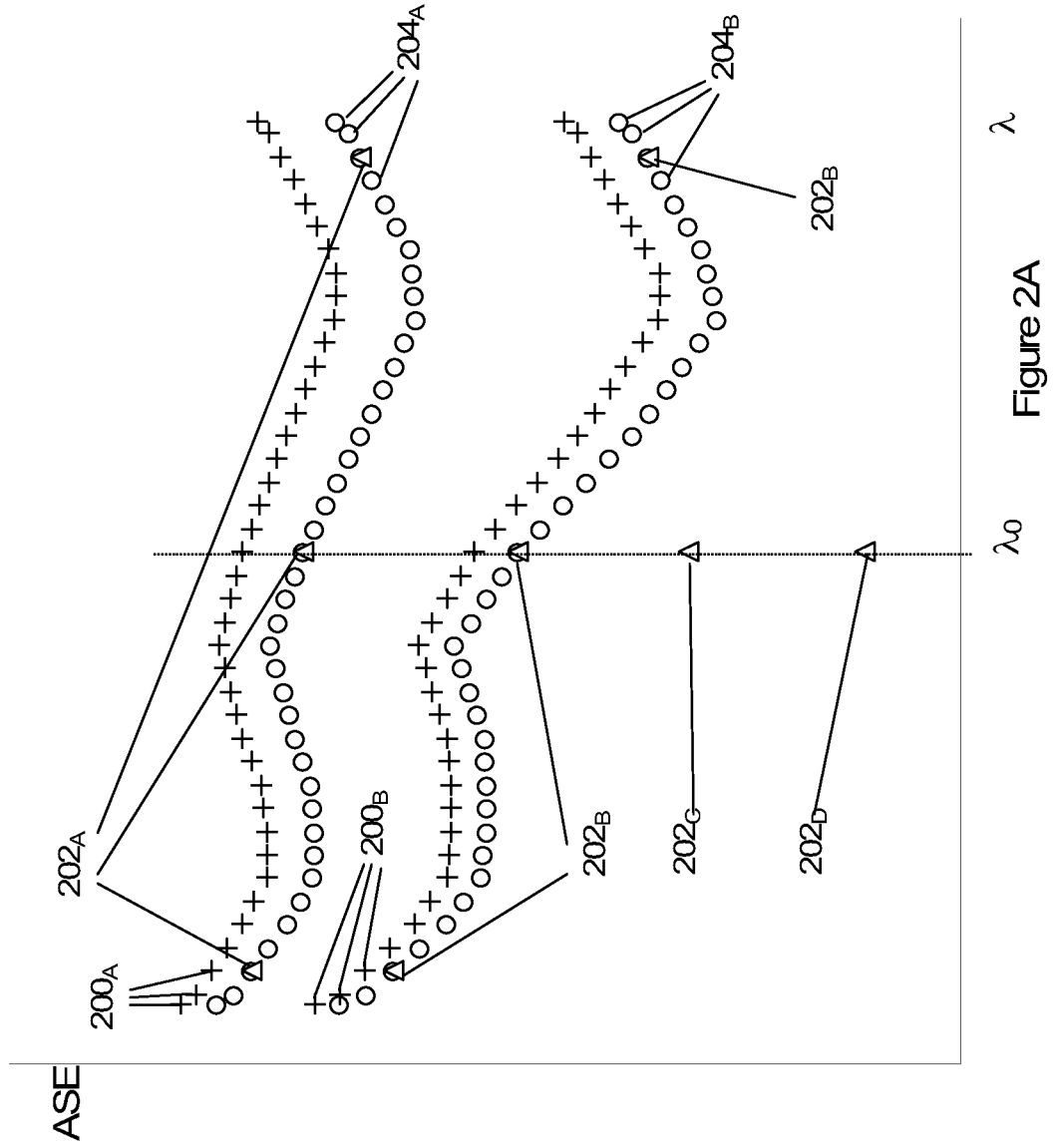
FIG. 2A is a graph of training data set.

The training data set $200_A$ and $200_B$ is shown in the graph of FIG. 2A. The training data set comprises ASE values measured at both a high gain $200_A$ and a low gain $200_B$ across a range of wavelengths, and at the same EDF temperature.

In an alternative method a single amplifier and its passive losses were characterised in detail so as to determine the in-erbium performance, and the resultant data was then used to predict a per-amplifier performance utilising also the characteristic passive loss of each amplifier. Whilst such a method requires an extra step in production, it can be more accurate. In another alternative method an amplifier behavioural model was used to generate datasets 200A and 200B. Multiple techniques may be used to generate the datasets 200A and 200B, whichever method is used the necessary characterisation steps need only be carried out once for any optical amplifier design.

Following characterisation of the ASE performance of the training optical amplifier 100, the ASE performance of a production optical amplifier 300 (illustrated in FIG. 3), of substantially identical construction (to the training optical amplifier), is characterised over a significantly reduced production range of operating parameters, e.g. wavelength, gain level, power output and temperature. ASE values corresponding with the characterised performance are collated within a preliminary data set $202_A$ and $202_B$ (FIG. 2A) comprising a significantly lesser number of data points than the training data set $200_A$ and $200_B$. The preliminary data set $202_A$ and $202_B$ comprises data points corresponding to a sub-set of the data points of the training data set $200_A$ and $200_B$, and which have substantially the same parameter values as data points of the training data set. The production data set may also comprise data points $202_D$ and $202_D$ that do not correspond to the parameter values of data points of the training data set $200_A$ and $200_B$ (e.g. at different gain levels from those of the training data set $200_A$ and $200_B$).

Correspondence between the parameter values of data points within the production data set and the training data set facilitates direct comparison of their ASE values. However, alternatively, extrapolation from the data points of the training data set can be used to produce extrapolated data points for parameter values corresponding to the data points of the production data set, and the extrapolated data points can be used for comparison with corresponding data points from the training data set.

Corresponding data points from the training and production data sets having substantially the same parameter values are compared to determine their difference at the same operating condition. For each gain level (or power output) and at each EDFA temperature a linear adjustment with respect to wavelength is determined for the data points of the training data set, which would minimise the differences in the ASE values of the corresponding pairs of data points by the root mean square method. Alternatively, other known difference minimisation algorithms may be used. The linear adjustment comprises an offset and a tilt coefficient.

To do this the entire training data set is adjusted by the linear adjustments corresponding with the gain level (temperature, etc.) of the data points, to produce an adjusted data set $204_A$ and $204_B$. For example, each of the ASE values of the high gain group of data points in the training data set $200_A$ is adjusted in accordance with the following equation to determine an adjusted ASE value ($AAV_A$)

$$AAV_A = ASE_A + \text{offset}_A + \{(\lambda - \lambda_0) \times \text{tilt coefficient}_A\}$$

where λ is the wavelength of the optical data signal at the data point in question, and $\lambda_0$ is a reference wavelength (e.g. a mid-point of the wavelength range of the production data set). The same procedure is followed with the same offset and tilt coefficient with respect to the ASE values of the low gain group of data points in the training data set $200_B$ to determine a further group of adjusted ASE values ($AAV_B$), these AAV datasets being then used to determine ASE values for any gain and wavelength as described below. The final offset and tilt coefficient will be obtained when the error between both sets of data $202_A$ and $202_B$ is minimised to the adjusted training sets $204_A$ and $204_B$.

In a preferred production cycle the ASE of each amplifier was measured at only three wavelengths and two gains (6 points, 202A (external gain g1) and 202B (external gain g2)). A linear algorithm was then used to match the measured 6 points to the more thorough reference data (the training data set), by shifting the reference data to a closest match to the 6 points (new datasets 204A and 204B). The closest match routine used the root sum square method, but any best fit algorithm could have been used. The Dynamic ASE Tilt (DAT) was then calculated for each wavelength from the equation:

$$DAT_\lambda = (ASE_{xg1} - ASE_{xg2})/(ASE_{nomg1} - ASE_{nomg2})$$

where
DAT$_\lambda$ is the DAT at input signal wavelength $\lambda$
ASE$_{ab}$ is the ASE value at wavelength a and gain b
nom is the nominal (fixed reference) wavelength (which is generally the mid-point, although it does no need to be)
g1 is the external gain 1
g2 is the external gain 2

The dynamic ASE tilt (DAT) is a characteristic specific to an amplifier design that is determined from the adjusted ASE value dataset and then used in the required algorithm. It may be characterised by a curve indicative of variation of DAT with wavelength.

Further linear adjustment terms can be determined for other gain levels (or other parameters, e.g. temperatures).

Figure 2B:
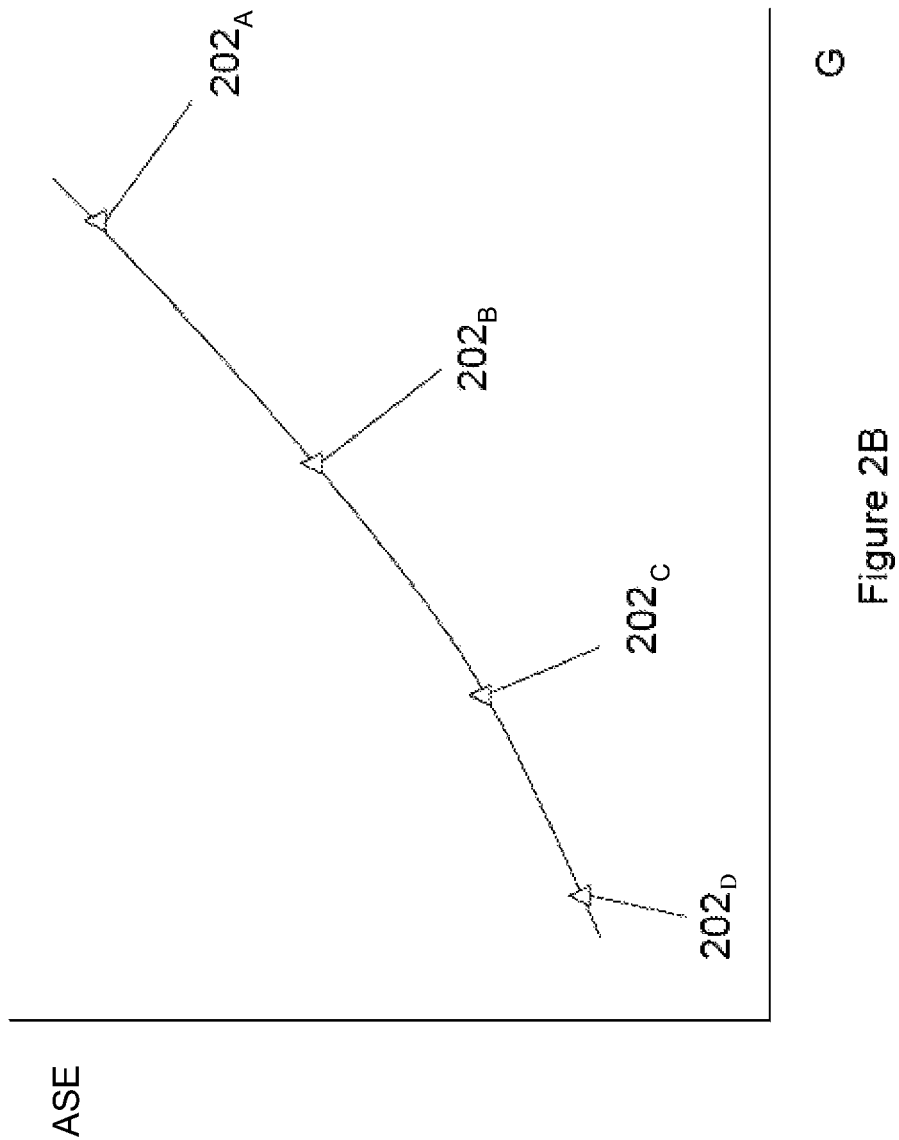
FIG. 2B is a further explanatory graph.

In the preferred production cycle each amplifier then has its ASE value measured at a single (nominal) wavelength $\lambda_0$ at two further gains 202C and 202D (FIG. 2B). In this particular example these two further gains are lower than the gains g1 and g2 at which the 6 data points 202A, 202B are measured, although it would alternatively be possible for these gains to be higher than the gains g1 and g2. A curve is then fitted to the data points 202A to 202D so that it becomes possible to predict the ASE value against gain for the nominal wavelength.

Using the curves 204A and 204B, the DAT$_\lambda$ value and the curve fit to 202A to 202D, it is possible to predict the ASE value for any input signal wavelength and for any external gain, using the equation:

$$ASE_{x\lambda} = ASE_{g1\lambda} - DAT_\lambda * (ASE_{g1nom} - ASE_{xnom}) + Off(g)$$

where
ASE$_{x\lambda}$ is the predicted ASE value with input signal wavelength $\lambda$ and external optical gain x
ASE$_{g1\lambda}$ is the ASE value with input signal wavelength $\lambda$ and external optical gain g1
DAT$_\lambda$ is the dynamic ASE tilt for input signal wavelength $\lambda$ The more ASE values that are measured for the production optical amplifier the more accurate will be the ASE compensation applied to the amplifier. However the minimum number of ASE values that require to be measured is two, one for each gain. It is then possible to calculate an ASE$_{nom}$(g) fit from these measured values after tilting and offsetting, and to determine an ASE matrix using only these measured values that will still produce a better performing amplifier than if no ASE compensation had been applied.

The data points in FIGS. 2A and 2B have all been determined at the same temperature, as would be required in the case of a thermally stabilised EDFA. However, in the event that the temperature of the EDF within the production optical amplifier is not thermally stabilised (e.g. by a heater or a thermo-electric cooler such as a Peltier cooler), characterisation of a training optical amplifier can be used to determine the compensation coefficients at different temperatures. Accordingly, by a similar method to the extrapolation illustrated in either FIG. 2A or FIG. 2B, an adjusted data set of compensation values can be determined that includes compensation for EDF temperature variations. In the case in which the EDF is not thermally stabilised, a monitor would typically be provided to feed back a signal in relation to the EDF temperature to the control electronics.

Figure 3:
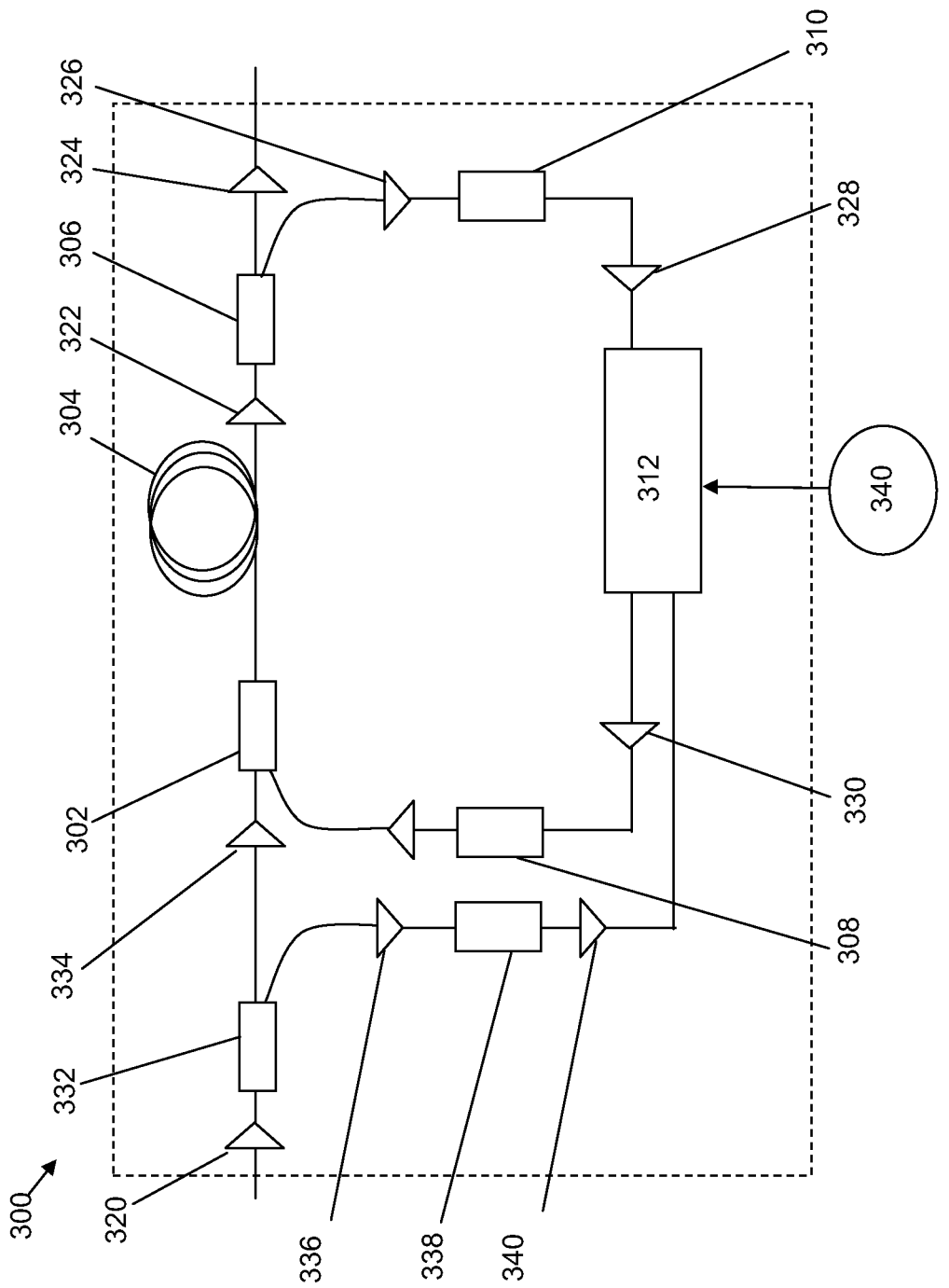
FIG. 3 schematically illustrates a production optical amplifier.

FIG. 3 illustrates a production optical amplifier 300. For convenience, the component parts of the production optical amplifier 300 which are, in effect, equivalent to corresponding parts in the training optical amplifier 100 shown in FIG. 1 are identified by the same reference numerals incremented by 200. Thus the EDF illustrated in FIG. 3 is denoted by reference numeral 304, as compared to EDF 104 in FIG. 1. A look-up table 340 of ASE values AAV is provided to govern the ASE value applied to the pump laser 308 by the control electronics 312.

Accordingly, by the method of the invention, it is not necessary to fully characterise the ASE performance of the production optical amplifier 300 with respect to operational parameters, as in the case of the prior art. By contrast, the production optical amplifier 300 needs to be subjected only to a brief characterisation to produce a much smaller preliminary data set, from which an adjusted data set of ASE values AAV is determined. Then, for a given operational wavelength, gain level or power level, temperature and an operating ASE value can be extrapolated from the adjusted ASE values AAV$_A$ and AAV$_B$ at (or close to) that wavelength. To this end the optical detector 338 supplies an electrical signal indicative of the optical input power and optical detector 310 supplies an electrical signal indicative of the optical output power to the control electronics 312 to provide information of the gain and/or output power, and the wavelength of the optical signal is determined by the control electronics 312 either from the system control or by information passed from another optical component in the system, such as an Optical Channel Monitor (OCM), and this then enables the required adjustment to be applied to the pump laser 308 by the control electronics 312.

Advantageously an ASE (gain, wavelength, temperature) table can be more quickly and cheaply determined by the method of the present invention than by the prior art methods.

Advantageously, the compensation technique can be applied to a system with many signal channels, such as a Dense Wavelength Division Multiplexed (DWDM) transmission system, in which signal channels need to be added to or dropped from the existing system configuration. Knowledge of the signal wavelength and ASE will allow faster and more accurate determination of impact to the non-affected signal channels.

It will be appreciated that the ASE compensation method described above can be implemented by using channel wavelength information provided by an optical channel monitor (OCM) or an Optical Power Monitor (OPM) or user input to adjust ASE compensation in order to improve gain or signal power accuracy. For an amplifier with non-flat gain, the required ASE for accurate gain or signal accuracy is wavelength dependent. Simple knowledge of the channel wavelengths present in an amplifier provides enough information to give substantial improvement in the gain or signal power accuracy. Detailed channel gain or power values from the OCM before and after amplification may not be required but as more information is used the error can be reduced further.

At high output signal powers (typically high channel counts and fully loaded channel plans) the amount of ASE is typically small in proportion to the signal power and thus has at most only a small impact on gain accuracy. At low signal powers (few channels or sparsely loaded channel plans) the ASE can easily exceed the signal power and thus have a significant impact on the gain or power setting accuracy.

It is worth mentioning that the ASE power is very nearly constant for a given average inversion of the EDF. As a result, the total ASE power of a flattened amplifier is roughly independent of both the exact channel wavelengths that are present and the output signal power because the same average inversion gives the same gain for all wavelengths.

It is further worth mentioning that amplifiers (specifically EDFAs) can have non-flat gain spectra for a number of reasons. Non-flatness can result from a lack of a Gain Flattening Filter (GFF) to compensate the fundamental gain variation from the gain medium, or from operation in a tilted condition.

As previously mentioned, for a non-flattened amplifier, the average inversion required for a specific gain is wavelength dependent. This means that the ASE compensation will also need to be wavelength dependent in order to accurately achieve a target gain for a given input wavelength. The wavelength dependence of the ASE can be characterized at the time of manufacture and programmed into the amplifier.

As such, the OCM/OPM or customer just has to provide the wavelengths of the channels that are present in the amplifier and the controls can then calculate the appropriate ASE compensation required for the combination of gain setting and wavelengths present. Measurement of the relative powers in all the channels present (either before or after amplification) can be used to calculate an effective average wavelength for the purposes of the ASE compensation.

With information from the OCM/OPM or customer as to the relative power in each of the channels, the appropriate weighting can be applied in order to further improve the ASE compensation.

The invention claimed is:

1. A method of operating a production optical amplifier comprising:
   (i) determining a data set of training amplified spontaneous emission (ASE) values of a training optical amplifier over a plurality of training operating conditions,
   (ii) determining a data set of production ASE values of the production optical amplifier over a plurality of production operating conditions, the plurality of production operating conditions corresponding to at least a sub-set of the plurality of training operating conditions,
   (iii) determining an adjusted data set of adjusted ASE values produced by extrapolation from the production data set so that the adjusted data set is provided over a plurality of operating conditions corresponding to at least the plurality of training operating conditions,
   (iv) determining, for each of a plurality of operating conditions, a dynamic ASE tilt factor from the training data set and the adjusted data set so determined,
   (v) determining a larger data set of ASE values over a wider set of operating conditions than either the training data set or the production data set from the adjusted ASE data set and the dynamic ASE tilt factor, and
   (vi) compensating the optical output power of the production optical amplifier in correspondence with the larger ASE data set generated in correspondence from the production data set and the dynamic ASE tilt factor over the plurality of operating conditions, which is a larger set of operating conditions than that of the training data set or production data set.

2. A method according to claim 1, wherein the adjusted ASE values are used to determine ASE values at a range of wavelengths and/or external operating gains.

3. A method according to claim 1, wherein the adjusted data set of adjusted ASE values is determined from the data set of production ASE values by offsetting and tilting the production ASE values to match the training ASE values of the training data set.

4. A method according to claim 3, wherein the offsetting and tilting are determined to minimise the root mean square of the difference between corresponding ASE values of the training data set and the production data set.

5. A method according to claim 1, wherein the adjusted data set comprises adjusted ASE value corresponding to each of the training ASE values of the training data set.

6. A method according to claim 1, wherein the plurality of training operating conditions comprises a plurality of operating wavelengths.

7. A method according to claim 1, wherein the plurality of production operating conditions comprises an operating condition that does not correspond with a training operating condition.

8. A method according to claim 1, wherein the plurality of training operating conditions comprises a plurality of gain or output power levels.

9. A method according to claim 1, wherein the dynamic ASE tilt (DAT) factor is determined from:

$$DAT_\lambda = (ASE_{xg1} - ASE_{xg2})/(ASE_{nomg1} - ASE_{nomg2})$$

where
$DAT_\lambda$ is the DAT at input signal wavelength $\lambda$
$ASE_{ab}$ is the ASE value at wavelength a and gain b
nom is a nominal (fixed reference) wavelength
g1 is an external gain 1
g2 is an external gain 2.

10. A method according to claim 1, wherein the adjusted ASE values are used to determine ASE values at a range of wavelengths and/or external operating gains using the relation:

$$ASE_{x\lambda} = ASE_{g1w} - DAT_\lambda * (ASE_{g1nom} - ASE_{xnom}) + Off(g)$$

where
$ASE_{x\lambda}$ is the predicted ASE with input signal wavelength $\lambda$ and external optical gain x
$ASE_{g1\lambda}$ is the ASE with input signal wavelength $\lambda$ and external optical gain g1
$DAT_\lambda$ is the dynamic ASE tilt for input signal wavelength $\lambda$.

11. A method according to claim 1, wherein the plurality of training operating conditions comprises a plurality of temperatures associated with part of the training optical amplifier and the production optical amplifier.

12. A method according to claim 1, wherein the training optical amplifier and the production optical amplifier comprise erbium doped fibre amplifiers (EDFAs).

13. A method according to claim 1, wherein the training ASE values are average training ASE values of a plurality of training optical amplifiers.

14. A method according to claim 1, further comprising using channel wavelength information provided by an optical channel monitor (OCM) or an optical power monitor (OPM) or user input to adjust the ASE values in order to improve the gain or signal power accuracy.

15. A method according to claim 14, wherein a measurement from the OCM or the OPM is taken either preceding or following amplification.

16. A method according to claim 1, further comprising using channel wavelength information provided by user input provided by an external optical channel monitor (OCM) or an optical power monitor (OPM), or provided by having a priori knowledge of the channel wavelength to adjust the ASE values in order to improve the gain or signal power accuracy.

17. A method according to claim 16, wherein a measurement from the OCM or the OPM is taken either preceding or following amplification.

18. A production optical amplifier adapted to compensate an optical output for ASE noise in dependence on a data set of training amplified spontaneous emission (ASE) values previously obtained by use of a training optical amplifier over a plurality of training operating conditions, the amplifier comprising:
   (i) means for determining a data set of production ASE values of the production optical amplifier over a plurality of production operating conditions, the plurality of production operating conditions corresponding to a subset of the plurality of training operating conditions, (ii) means for determining an adjusted data set of adjusted ASE values produced by extrapolation from the production data set so that the adjusted data set is provided over a plurality of operating conditions corresponding to the plurality of training operating conditions, (iii) means for determining, for each of a plurality of operating conditions, a dynamic ASE tilt factor from the training data set and the adjusted data set so determined, (iv) means for determining a larger data set of ASE values over a wider set of operating conditions than either the training data set or the production data set from the adjusted ASE data set and the dynamic ASE tilt factor, and (v) means for compensating the optical output power of the production optical amplifier in correspondence with the larger ASE dataset generated from the production data set and the dynamic ASE tilt factor over the plurality of operating conditions, which is a larger set of operating conditions than that of the training data set or production data set.

19. An optical network comprising a production optical amplifier adapted to compensate an optical output for ASE noise in dependence on a data set of training amplified spontaneous emission (ASE) values previously obtained by use of a training optical amplifier over a plurality of training operating conditions, the amplifier comprising:

(i) means for determining a data set of production ASE values of the production optical amplifier over a plurality of production operating conditions, the plurality of production operating conditions corresponding to a subset of the plurality of training operating conditions, (ii) means for determining an adjusted data set of adjusted ASE values produced by extrapolation from the production data set so that the adjusted data set is provided over a plurality of operating conditions corresponding to the plurality of training operating conditions, (iii) means for determining, for each of a plurality of operating conditions, a dynamic ASE tilt factor from the training data set and the adjusted data set so determined, (iv) means for determining a larger data set of ASE values over a wider set of operating conditions than either the training data set or the production data set from the adjusted ASE data set and the dynamic ASE tilt factor, and (v) means for compensating the optical output power of the production optical amplifier in correspondence with the larger ASE dataset generated from the production data set and the dynamic ASE tilt factor over the plurality of operating conditions, which is a larger set of operating conditions than that of the training data set or production data set.

* * * * *